Nov. 18, 1958  J. R. PROKSA  2,860,402
CUTTING TOOL HOLDER
Filed June 9, 1954  2 Sheets-Sheet 1
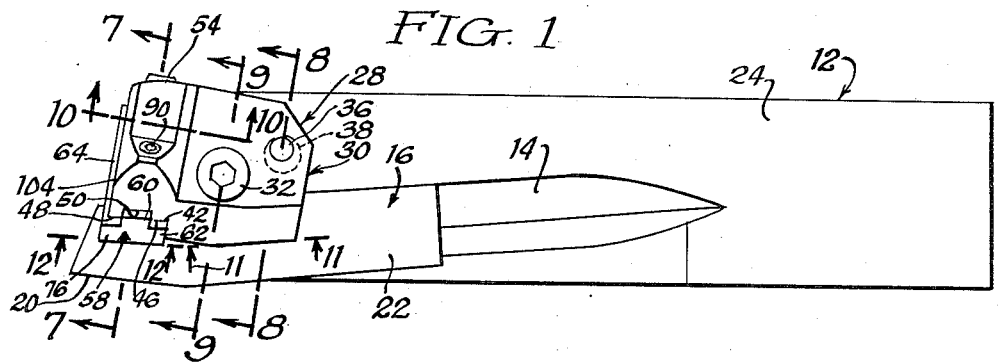
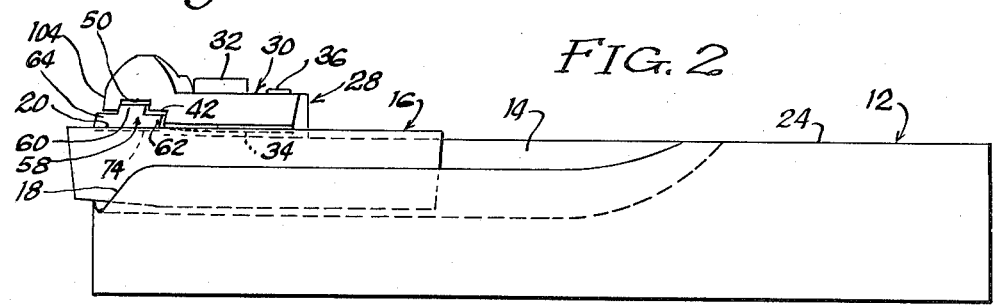
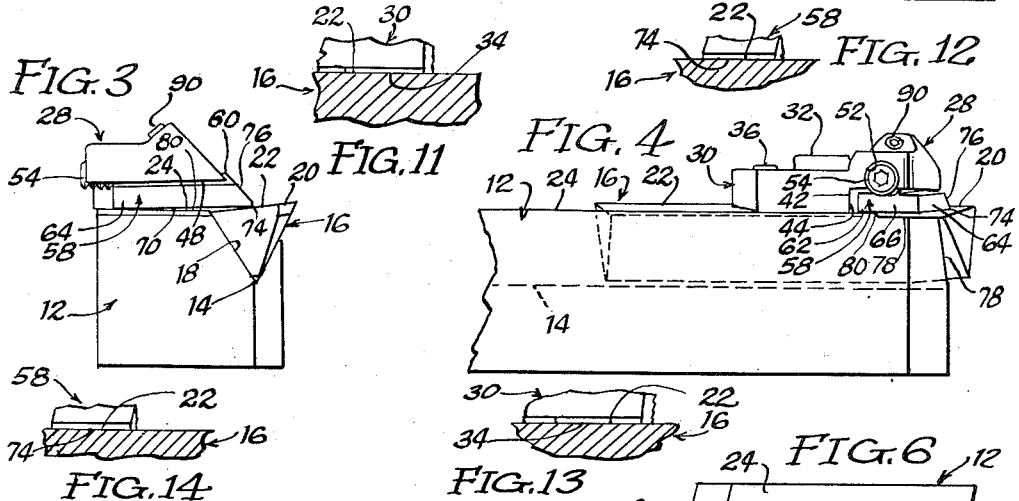
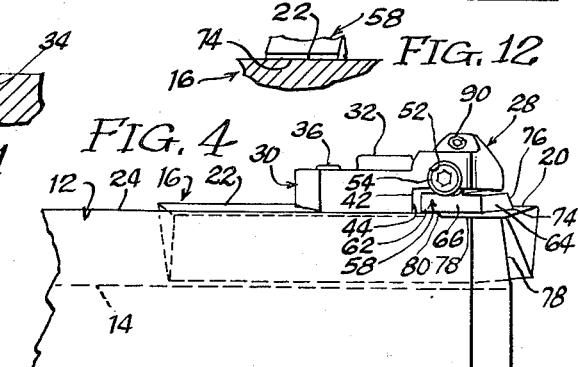
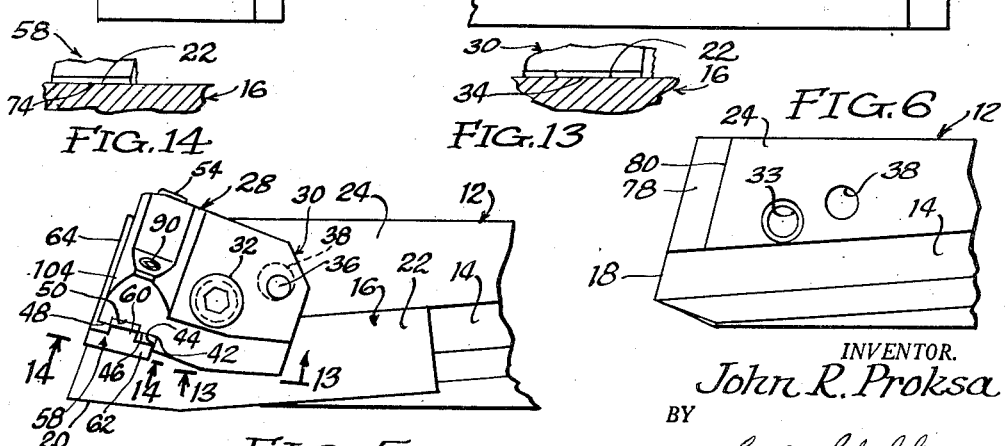
INVENTOR.
John R. Proksa
BY
Louis Sheldon
Att'y Nov. 18, 1958   J. R. PROKSA   2,860,402
CUTTING TOOL HOLDER
Filed June 9, 1954   2 Sheets-Sheet 2
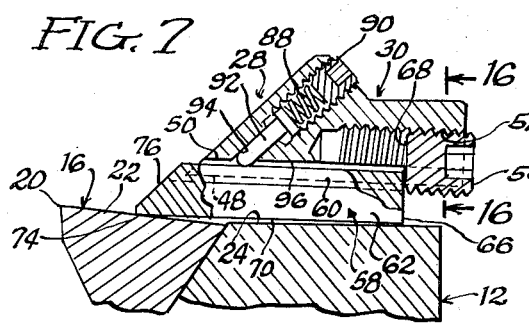
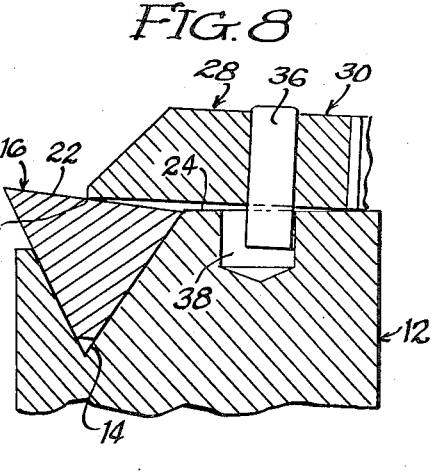
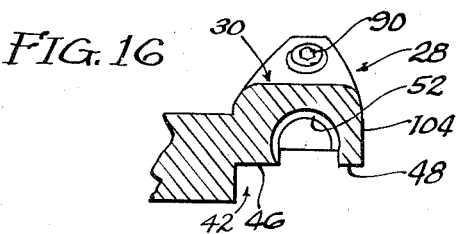
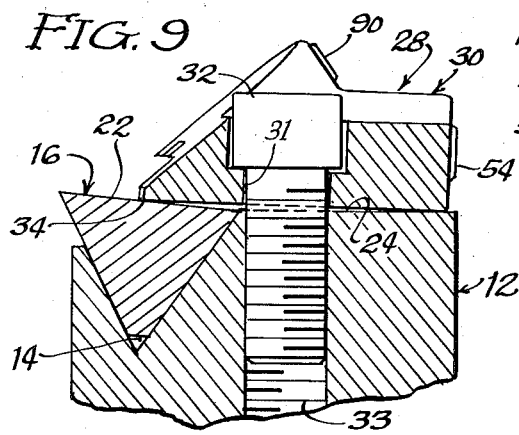
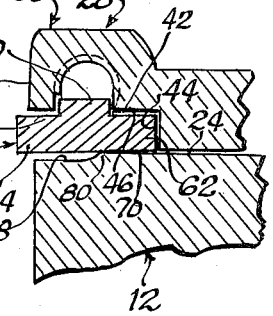
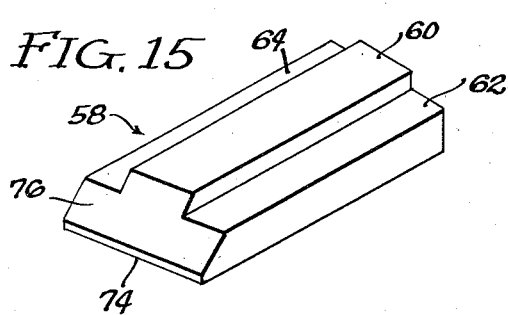
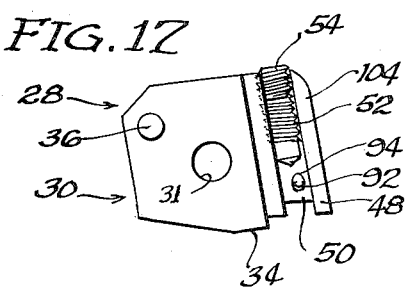
INVENTOR.
John R. Proksa
BY
Louis Sheldon
Att'y

United States Patent Office 2,860,402
Patented Nov. 18, 1958

2,860,402

CUTTING TOOL HOLDER

John R. Proksa, Elmwood Park, Ill.

Application June 9, 1954, Serial No. 435,580

17 Claims. (Cl. 29—96)

This invention relates to tool bit holders and chip-breakers therefor, and is concerned more particularly with improvements in certain of the subject matter of my co-pending application Serial No. 418,960, filed March 26, 1954, entitled "Tool Bit Holder."

An object of this invention is to provide improved means for adjusting the chip-breaker such that a less expensive chip-breaker may be used.

Another object is to provide a bit clamp and chip-breaker assembly enabling the chip-breaker to be adjusted relative to the clamp.

A further object is to provide a bit clamp and chip-breaker assembly in which the chip-breaker may be adjusted toward and away from and to different angles relative to the cutting edge.

It is also an object to provide a bit clamp and chip-breaker assembly such that the chip-breaker may be readily assembled with and disassembled from the clamp.

An additional object is to provide a chip-breaker which may be made of carbide throughout and used up with minimum waste.

Another object is to provide a clamp and chip-breaker assembly such that the chip-breaker is universally adjustable relative to the cutting tip.

Further objects and advantages of the invention will appear as the description proceeds.

The invention will be better understood upon reference to the following description and the accompanying drawing, in which:

Fig. 1 is a top plan view of one form of the invention.

Figs. 2, 3, and 4 are respectively front, end, and rear elevational views of the same.

Fig. 5 is similar to Fig. 1 but shows a different adjustment.

Fig. 6 is a top plan view of the tool holder shank alone.

Figs. 7 to 12 are magnified sectional views taken as indicated by the lines 7—7, 8—8, 9—9, 10—10, 11—11, and 12—12, respectively, in Fig. 1.

Figs. 13 and 14 are magnified views taken as indicated by the lines 13—13, and 14—14, respectively, in Fig. 5.

Fig. 15 is an enlarged isometric view of the chip-breaker alone.

Fig. 16 is a sectional view taken as indicated by the line 16—16 in Fig. 7.

Fig. 17 is a bottom plan view of the cap.

Referring now more particularly to the drawings, disclosing an illustrative embodiment of the invention, there is shown a shank 12 having a V-groove 14 adapted to accommodate a tool bit such as a triangular tool bit 16 which may be equilateral if desired, the bit being adapted to project out of the open end 18 of the groove and the working end of the bit being ground to provide a suitable cutting edge or tip 20. The bisector of the angle of the groove 14 is preferably inclined so that the upper face 22 of the bit 16 is inclined downward and rearward relative to the upper face 24 of the shank.

The bit clamp 28 comprises a cap 30 having a countersunk hole 31 and adapted to be clamped over and against the shank face 24 by a screw 32 passing through said hole and engaged in a tapped hole 33 in the shank 12, with the forward bottom edge portion 34 of the cap overhanging the bit 16 so as to bear firmly on the bit face 22 when the screw is tight. The cap 30 may be provided with a press-fitted or otherwise secured depending pin 36 movable through a limited arc in an oversize hole 38 in the shank 12 so that, upon initial assembly with the shank, the cap will be located in a position at or close to that in which the operator desires to clamp it. However, the latter feature may be omitted if desired.

The bottom of the cap 30 is rabbeted at 42 to provide an unstanding wall 44 and a ceiling divided into two parts 46 and 48 by a channel or keyway 50, the rear part of which communicates with a slightly more than half-round tapped hole 52 in which a screw 54 is engaged.

The chip-breaker 58 may be in the form of a molded tungsten carbide or other suitable wear-resistant bar T-shaped in cross-section so that its stem 60 serves as a key or tongue received and longitudinally adjustable in the groove or keyway 50, with one wing 62 facing the rabbet surfaces 44 and 46 and the other wing 64 facing the rabbet surface 48, its rear end 66 facing and adapted to abut the front end 68 of the screw 54, and its bottom 70 facing the shank face 24. The bar 58 has at its forward end 72 a straight bottom edge 74 adapted to have full length engagement with the upper face 22 of the bit 16, and an upwardly and rearwardly bevel-ground face 76 against which the chips are adapted to impinge. The bar 58 is easily adjustable forward by the screw 54 or rearward by hand to the extent permitted by the screw.

The upper end portion 78 of the shank 12 is depressed below the level of the top face 24, affording at the adjacent end of said face an edge 80 disposed between the longitudinal margins of the bar 58.

A spring 88 confined between a screw 90 and a plunger 92 biases the plunger through a hole 94 in the keyway ceiling 96 into engagement with the forward part of the top of the chip-breaker key 60 to yieldably clamp the forward edge 74 of the chip-breaker 58 against the top 22 of the bit 16. The screw 90 may be adjusted to vary the pressure of the spring 88.

With the pin 36 in the hole 38, the screw 32 is the only means for assembling the cap 30 and breaker 58 with the shank 12. With the screw 32 loose, the operator turns the cap 30 about the screw to the desired position, tightens the screw, and adjusts the screw 54 to position the beveled face 76 of the chip-breaker bar 58 at the desired distance from the cutting edge 20 of the bit 16. The construction is such as to insure full line engagement of the bar edge 74 with the bit surface 22. Of course, if the adjustment is such that the bar edge 74 is touching the bit surface 22 and is parallel to the axis of the bit, said edge will be in full line contact with said surface, and will be there clamped by the spring-biased plunger 92. However, if the adjustment is such that the bar edge 74 is skew to the bit axis, provision must be made to allow the bar to rock or tilt in the keyway 50 in order that the bar edge may assume a position in which it has full line contact with the bit surface 22. The key 60 has a sloppy fit in the keyway 50, enabling the bar 58 to rock on the fulcrum edge 80 of the shank 12, and the plunger 92 acts to cause such fulcruming as is necessary to insure such full line contact, so that chips cannot enter between the bit top 22 and the bar.

By virtue of the sloppy fit, the bar 58 is capable of being shifted slightly up and down as well as sideways to facilitate further the proper positioning of the bar. It is thus apparent that the bar 58 is universally adjustable so that proper positioning thereof can be readily effected.

The forward edge 34 of the cap 30 will have full line contact with the bit top 22 when the screw 32 is tightened in the several adjustments of the cap, since the shank has substantially only point contact with the shank top 24 when the bit 16 is in operative position.

The plunger 92 also serves to prevent the bar 58 from accidentally falling out when the clamp screw 32 is tight and the unit is removed from the lathe or other machine tool.

Any chips which might otherwise impinge on and thus wear the outer side 104 of the cap 30 are prevented from so doing by reason of the fact that the bar wing 64 projects beyond said cap side and will thus divert chips away from said side.

As wear occurs, the chip-breaker bar 58 is removed and its face 76 further bevel-ground and the bar is re-inserted and adjusted forward by the screw 54 a corresponding distance, so that nearly all of the bar can be used. The engagement of the plunger 92 with a forward part of top of the key 60 is a contributing factor in this respect.

Various modifications coming within the spirit of my invention may suggest themselves to those skilled in the art, and hence I do not wish to be limited to the specific forms shown or uses mentioned, except to the extent indicated in the appended claims, which are to be interpreted as broadly as the state of the art will permit.

I claim:

1. A tool bit and holder unit comprising a shank, a rotatably adjustable cap, a tool bit between said shank and cap, releasable means for exerting pressure on said cap to clamp said bit between said shank and cap, a chip-breaker between said cap and bit and mounted for movement toward and against the tool bit, adjustable means for providing a variably positioned, forwardly facing abutment shoulder against which said chip-breaker can bear; adjusting the position of said chip-breaker relative to said cap and bit, and separate means adjustable in position relative to the cap along a line making a substantial angle with the direction of adjustment of said chip-breaker for clamping said chip-breaker in adjusted position against said bit.

2. A tool bit and holder unit comprising a shank, a tool bit, a cap disposed near the cutting tip of said bit, a screw threaded in said shank and having a head for engagement with said cap and operative when tightened to clamp said bit between said shank and said cap, said cap being rotatably adjustable about said screw when said screw is loose, whereby said cap may be clamped in a selected position against said bit, a chip-breaker mounted for movement toward and against the tool bit and movable with and adjustable relative to said cap and having a front beveled chip-breaker end, a screw threaded to said cap and engageable with a rearward-facing part of said chip-breaker to adjust said chip-breaker into desired proximity to said tip, and means carried by said cap adjustable in position relative to the cap along a line making a substantial angle with the direction of adjustment of said chip-breaker for clamping said front end against said bit.

3. A tool bit holder comprising a shank having a groove, a tool bit in said groove, a clamp cap having a tool-bit-face-engaging front jaw, a screw threaded in said shank and having a head engageable with said cap to clamp said jaw against said bit so as to retain said bit in said groove, said cap having a fore-and-aft slot open at the bottom and front of said cap, the front end of said slot being disposed nearer than said jaw to the cutting tip of said bit, a chip-breaker disposed in said slot and mounted for movement toward and against the tool bit, the front end of said chip-breaker being disposed near and rearward of said tip and adjacent said jaw, a screw threaded in said cap and engaging said chip-breaker in a position to adjust said chip-breaker relative to said tip and cap and to back said chip-breaker in service, the front end of said chip-breaker having a bit-engaging edge, and means carried by said cap adjustable in position relative to the cap along a line making a substantial angle with the direction of adjustment of said chip-breaker and engageable with the top of said chip-breaker near the front end of said chip-breaker for clamping said chip-breaker edge against said bit.

4. A tool bit holder comprising a shank having a groove, a tool bit in said groove, a clamp cap having a tool-bit-face-engaging front jaw, a screw threaded in said shank and having a head engageable with said cap to clamp said jaw against said bit so as to retain said bit in said groove, said cap having a fore-and-aft slot open at the bottom and front of said cap, the front end of said slot being disposed nearer than said jaw to the cutting tip of said bit, a chip-breaker disposed in said slot, the front end of said chip-breaker being disposed near and rearward of said tip and adjacent said jaw, a screw threaded in said cap and engaging said chip-breaker in a position to adjust said chip-breaker relative to said tip and cap and to back said chip-breaker in service, the front end of said chip-breaker having a bit-engaging edge, and resilient means biasing said chip-breaker edge against said bit.

5. A tool bit holder comprising a shank, a tool bit on said shank, a clamp cap having a tool-bit-face-engaging front jaw, a screw threaded in said shank and having a head engageable with said cap to clamp said jaw against said bit so as to retain said bit on said shank, said cap having a fore-and-aft slot open at the bottom and front of said cap, the front end of said slot being disposed nearer than said jaw to the cutting tip of said bit, a chip-breaker disposed in said slot, the front end of said chip-breaker being disposed near and rearward of said tip and adjacent said jaw, a screw threaded in said cap and engaging said chip-breaker in a position to adjust said chip-breaker relative to said tip and cap and to back said chip-breaker in service, the front end of said chip-breaker having a bit-engaging edge, and a spring-pressed plunger retained in said cap and projecting down into said slot for biasing said chip-breaker edge against said bit.

6. A tool bit holder comprising a shank, a tool bit on said shank, a clamp cap having a tool-bit-face-engaging front jaw, a screw threaded in said shank and having a head engageable with said cap to clamp said jaw against said bit so as to retain said bit on said shank, said cap having a fore-and-aft slot open at the bottom and front of said cap, the front end of said slot being disposed nearer than said jaw to the cutting tip of said bit, a chip-breaker disposed in said slot, the front end of said chip-breaker being disposed near and rearward of said tip and adjacent said jaw, a screw threaded in said cap and engaging said chip-breaker in a position to adjust said chip-breaker relative to said tip and cap and to back said chip-breaker in service, the front end of said chip-breaker having a bit-engaging edge, said cap being rotatably adjustable about the first screw when the first screw is loose, whereby the chip-breaker is adapted to occupy the desired angular relation to the cutting tip, and means for clamping said edge against the bit.

7. A tool bit holder comprising a shank having a groove, a tool bit in said groove, a clamp cap having a tool-bit-face-engaging front jaw, a screw threaded in said shank and having a head engageable with said cap to clamp said jaw against said bit so as to retain said bit in said groove, said cap having a fore-and-aft slot open at the bottom and front of said cap, the front end of said slot being disposed nearer than said jaw to the cutting tip of said bit, a chip-breaker disposed in said slot, the front end of said chip-breaker being disposed near and rearward of said tip and adjacent said jaw, a screw threaded in said cap and engaging said chip-breaker in a position to adjust said chip-breaker relative to said tip and cap and to back said chip-breaker in service, the front end of said chip-breaker having a bit-engaging edge, said cap being rotatably adjustable about the first screw when the first screw is loose, whereby the chip-breaker is adapted to occupy the desired angular relation to the cutting tip, and resilient means biasing said edge against said bit.

8. A tool bit holder comprising a shank having a groove, a tool bit in said groove, a clamp cap having a tool-bit-face-engaging front jaw, a screw threaded in said shank and having a head engageable with said cap to clamp said jaw against said bit so as to retain said bit in said groove, said cap having a fore-and-aft slot open at the bottom and front of said cap, the front end of said slot being disposed nearer than said jaw to the cutting tip of said bit, a chip-breaker disposed in said slot and mounted for movement toward and against the tool bit, the front end of said chip-breaker being disposed near and rearward of said tip and adjacent said jaw, a screw threaded in said cap and engaging said chip-breaker in a position to adjust said chip-breaker relative to said tip and cap and to back said chip-breaker in service, the front end of said chip-breaker having a bit-engaging edge, said cap being rotatably adjustable about the first screw when the first screw is loose, whereby the chip-breaker is adapted to occupy the desired angular relation to the cutting tip, means limiting rotary adjustment of said cap, and means adjustable in position relative to the cap along a line making a substantial angle with the direction of adjustment of said chip-breaker for clamping said edge against said bit.

9. A tool bit holder comprising a support, a cap connected to said support solely by a screw, a tool bit adapted to be clamped between said support and cap pursuant to tightening of said screw, said cap being rotatably adjustable about said screw when said screw is loose, a chip-breaker mounted for movement toward and against a tool bit and assembled with said cap and adjustable therewith about said screw and means independent of said screw and movable relative to said cap for clamping said chip-breaker against said bit.

10. A tool bit holder comprising a support, a pressure member connected to said support by a screw, a tool bit between said support and member and adapted to be securely clamped in place by said support, member and screw, a chip-breaker mounted for movement toward and against the tool bit adjacent and movable relative to said member to locate an end thereof in a selected chip-breaking position relative to said bit, means engageable with the rear of said chip-breaker to prevent chips from pushing said chip-breaker from such position, and clamping means independent of said screw and movable relative to said pressure member for preventing accidental shift of said chip breaker.

11. A tool bit holder comprising a support adapted to receive a tool bit, a cap, a screw mounting said cap on said support with a front end portion of said cap overhanging said groove, said screw being operative to clamp said portion against a bit disposed in said groove, said cap having a keyway open at the front adjacent said portion, a chip-breaker in the form of a key loosely received in said keyway so as to be movable along and rockable transversely in said keyway, adjustable means in said cap at the rear of said keyway for engaging the rear of said key in selected longitudinal adjusted positions of said key relative to said keyway, with the front end of said key overhanging said groove, and means for pressing the front end of said key toward said groove.

12. A tool bit holder comprising a support having a groove adapted to receive a tool bit, and a chip-breaker having a straight forward edge and being received by and pivotally adjustable relative to said support to insure full length engagement of said edge with a flat face of the bit in the groove for different adjustments of said chip-breaker, and means yieldably biasing said edge toward the bottom of said groove.

13. A bit holder comprising a shank having a longitudinal V-groove for seating a tool bit of angular cross-section, said groove having an open end from which the cutting end of the bit is adapted to project beyond the adjacent end of said shank, a cap on said shank end and arranged to overlie a side of the bit, means for connecting said cap to said shank and clamping a portion of said cap against the bit to firmly hold the bit stationary in said groove, said cap having a slot in its underside, a chip-breaker slidably received in said slot and having a front beveled chip-breaker portion adjacent said cap portion, means on said cap for clamping said chip-breaker portion against the bit, means for preventing rearward movement of said chip-breaker notwithstanding pressure of chips on the front of said chip-breaker, and means on said cap for adjusting said chip-breaker forward.

14. A tool bit holder, comprising a support for a tool bit having a flat side, a chip breaker having a straight portion adapted to engage the bit side, said chip breaker being rotatably adjustable relative to said support so as to enable said portion to have substantially linear engagement with the bit side selectively in angularly related positions, and resiliently yieldable means for biasing said portion in such engagement with the bit side.

15. In a tool bit holder, a tool bit support having a socket, a chip breaker movable in said socket and having a forward edge adapted to project out of said socket and overhang the bit, means comprising a screw for adjusting said chip breaker relative to said socket so as to locate said edge in different overhanging positions relative to the bit, and resiliently yieldable means for biasing said edge in any selected position against the bit.

16. In a tool bit holder, a tool bit support, a chip breaker carried by said support and adjustable relative thereto so as to engage different portions, selectively, of the bit, resiliently yieldable means for biasing said chip breaker in any selected position against the bit, and means for adjusting the biasing pressure.

17. In a tool bit holder, a tool bit support for a tool bit, a chip breaker and tool bit carried by said support with said chip breaker having a forward edge clampingly engaging said bit, said chip breaker being adjustable so as to locate said edge in different positions relative to the bit, and resiliently yieldable means for biasing said edge against the bit.

References Cited in the file of this patent

UNITED STATES PATENTS

| | | |
|---|---|---|
| 2,181,023 | Moore | Nov. 21, 1939 |
| 2,270,387 | Spector | Jan. 20, 1942 |
| 2,457,469 | Hillman | Dec. 28, 1948 |
| 2,659,963 | Severson | Nov. 24, 1953 |

FOREIGN PATENTS

| | | |
|---|---|---|
| 453,173 | Great Britain | Sept. 7, 1936 |
| 989,306 | France | May 23, 1951 |
| 989,307 | France | May 23, 1951 |
| 1,041,370 | France | May 27, 1953 |